United States Patent
Nardi et al.

(10) Patent No.: US 9,938,624 B2
(45) Date of Patent: Apr. 10, 2018

(54) METHOD FOR ENHANCING BOND STRENGTH THROUGH IN-SITU PEENING

(71) Applicant: United Technologies Corporation, Hartford, CT (US)

(72) Inventors: Aaron T. Nardi, East Granby, CT (US); Tahany Ibrahim El-Wardany, Bloomfield, CT (US); William Werkheiser, East Hartford, CT (US); Michael A. Klecka, Coventry, CT (US)

(73) Assignee: United Technologies Corporation, Farmington, CT (US)

( * ) Notice: Subject to any disclaimer, the term of this patent is extended or adjusted under 35 U.S.C. 154(b) by 12 days.

(21) Appl. No.: 15/025,427

(22) PCT Filed: Oct. 17, 2014

(86) PCT No.: PCT/US2014/061114
§ 371 (c)(1),
(2) Date: Mar. 28, 2016

(87) PCT Pub. No.: WO2015/061164
PCT Pub. Date: Apr. 30, 2015

(65) Prior Publication Data
US 2016/0237573 A1 Aug. 18, 2016

Related U.S. Application Data

(60) Provisional application No. 61/895,213, filed on Oct. 24, 2013.

(51) Int. Cl.
*C23C 24/04* (2006.01)
*B32B 15/01* (2006.01)
*B24C 1/10* (2006.01)

(52) U.S. Cl.
CPC ............ *C23C 24/04* (2013.01); *B24C 1/10* (2013.01); *B32B 15/01* (2013.01)

(58) Field of Classification Search
CPC ............ B24C 1/10; B32B 15/01; C23C 24/04
(Continued)

(56) References Cited

U.S. PATENT DOCUMENTS 3,754,976 A * 8/1973 Babecki .................. C23C 24/04
29/527.2
4,753,094 A 6/1988 Spears
(Continued)

FOREIGN PATENT DOCUMENTS

DE 102006042374 A1 3/2008
EP 2612948 A2 7/2013
(Continued)

OTHER PUBLICATIONS

International Search Report and Written Opinion for Application Serial No. PCT/US2014/061114, dated Jan. 28, 2015, 14 pages.
(Continued)

*Primary Examiner* — Alexander M Weddle
(74) *Attorney, Agent, or Firm* — Kinney & Lange, P.A.

(57) ABSTRACT

One embodiment includes a method for enhancing bond strength between a powder deposit and a substrate. Powder is deposited on the substrate. Powder is shot peened with peening media that is harder than both the powder and the substrate to produce bond strength between the powder and the substrate that is at least twice bond strength between the powder and the substrate without shot peening.

19 Claims, 10 Drawing Sheets

(58) Field of Classification Search
USPC .......................................................... 427/180
See application file for complete search history.

(56) References Cited

U.S. PATENT DOCUMENTS

| | | | |
|---|---|---|---|
| 5,302,414 | A | 4/1994 | Alkhimov et al. |
| 6,715,640 | B2 | 4/2004 | Tapphorn et al. |
| 7,273,075 | B2 | 9/2007 | Tapphorn et al. |
| 8,113,025 | B2 | 2/2012 | Tapphorn et al. |
| 2006/0090593 | A1* | 5/2006 | Liu ....................... B22F 1/0048 75/252 |
| 2009/0065602 | A1* | 3/2009 | Tapphorn .................. B22F 7/04 239/10 |
| 2009/0098286 | A1 | 4/2009 | Lui et al. |
| 2010/0011826 | A1* | 1/2010 | Buehler ................... C21D 7/06 72/42 |
| 2011/0104991 | A1 | 5/2011 | O'Donoghue et al. |
| 2013/0230723 | A1 | 9/2013 | Bamberg et al. |

FOREIGN PATENT DOCUMENTS

| | | | |
|---|---|---|---|
| EP | 2617870 A1 | | 7/2013 |
| JP | 2008069428 A | | 3/2008 |
| JP | 2012192463 A | * | 10/2012 |

OTHER PUBLICATIONS

Extended European Search Report for EP Application No. 14855520.4, dated Jun. 21, 2017, 10 pages.

* cited by examiner

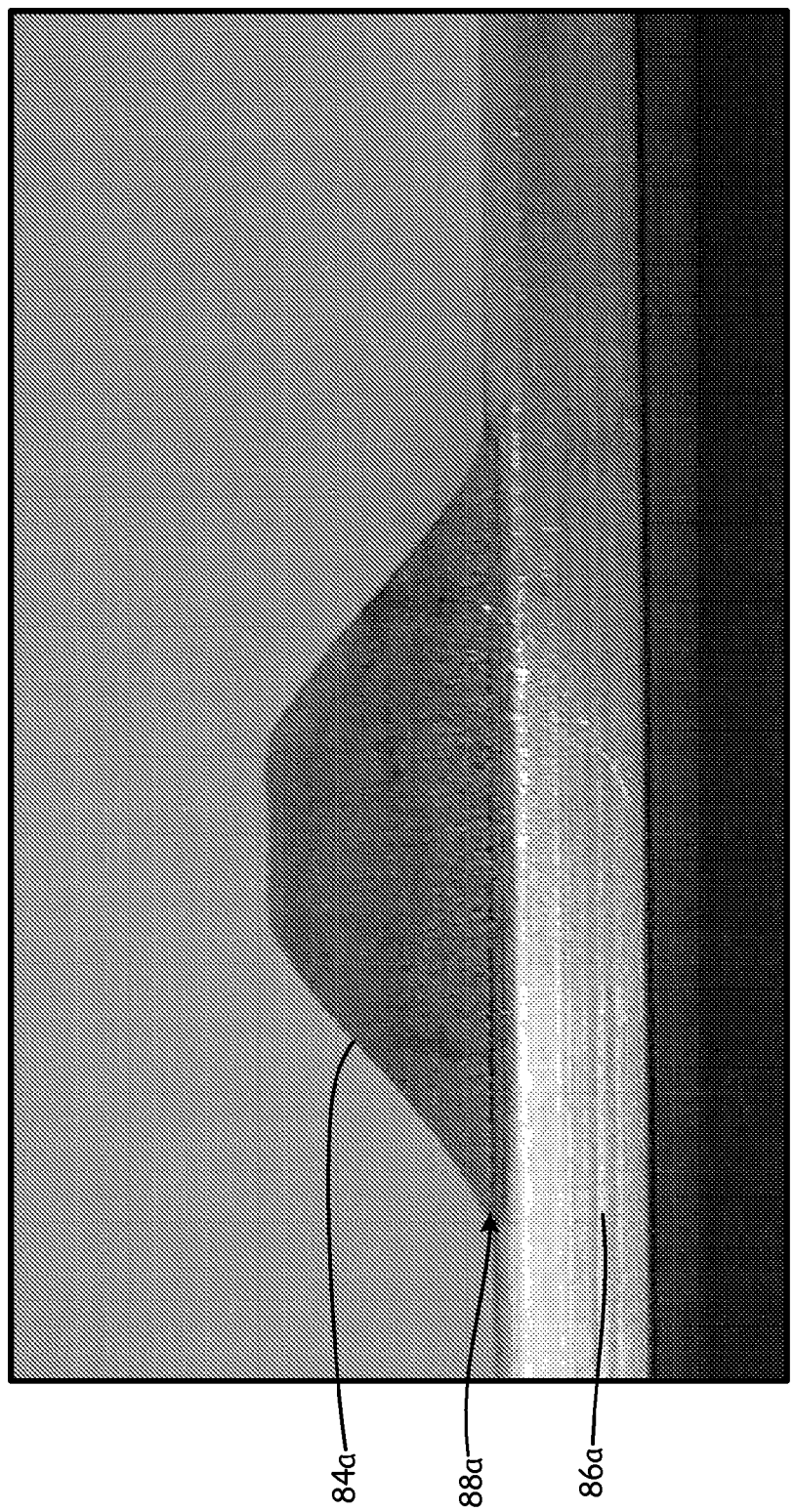

METHOD FOR ENHANCING BOND STRENGTH THROUGH IN-SITU PEENING

BACKGROUND

The present invention relates to the impact consolidation of powders and, more particularly, to processes for enhancing the bond strength between deposited powders and a substrate.

The impact consolidation process, and particularly cold spray, can be used to adhesively bond powders to a substrate or to cohesively bond powders together. A concern when adhesively bonding powders to a substrate is that the bond strength of the deposited powder to the existing substrate be strong enough to prevent any disjoinment. A concern when cohesively bonding powders together is that the powder deposit be dense enough and particle to particle bonding be high enough such that the resulting powder deposit has the desired material properties.

Approaches exist in the prior art relating to the use of the impact consolidation process in conjunction with shot peening. Shot peening is a process whereby solid particles are propelled at a high velocity by means of a carrier gas or fluid and impact a target surface. This impact with the target surface is known to cause desirable stress properties. Prior methodologies teach the use of shot peening as a means to increase the density of deposited powders. Some of these approaches disclose the use of shot peening post powder deposition to increase the density of the deposit, including for example, U.S. Pat. No. 8,113,025 issued to Tapphorn et al. Other approaches disclose the use of shot peening simultaneous to powder deposition to also increase the density of the powder deposit, including for example, U.S. Pat. No. 3,754,976 issued to Babecki et al.

SUMMARY

One embodiment includes a method for enhancing bond strength between a coating and a substrate. Powder is deposited on the substrate to form a coating. Coating is shot peened with peening media that is harder than both the coating and the substrate to produce bond strength between the coating and the substrate that is at least twice bond strength between the coating and the substrate without shot peening.

Another embodiment includes a method of increasing consolidation of a coating layer. The powder is deposited on a substrate to form a coating layer, and then depositing is terminated. Coating layer is shot peened with peening media that is at least 1.5 times a hardness of the coating layer to cause increase in deification of the coating layer.

A further embodiment includes an article comprising a substrate, and a coating formed by powder deposited on the substrate, wherein a bond strength between the coating and the substrate that is at least 50% of the lesser of a strength of the coating and a strength of the substrate.

BRIEF DESCRIPTION OF THE DRAWINGS

FIG. 7a is a side-elevational photograph of 6061 aluminum alloy coating on a hardened 6061 aluminum alloy substrate without use of shot peening.

DETAILED DESCRIPTION

Generally, in-situ peening operation is used to enhance bond strength between an impact consolidated powder deposit (or coating, as this terms are intended to be synonymous) and a substrate by increasing plastic flow at interface of the coating and the substrate.

Powder is deposited on a substrate to form a coating. One method of depositing powder, and thus forming a coating, is by utilizing a cold spray process, as disclosed for example in U.S. Pat. No. 5,302,414 issued to Alkhimov et al. Cold spray, a technique that is well known to those skilled in the art, is an additive manufacturing procedure in which powdered materials are propelled in a high velocity gas stream and subsequently deposited on substrate material causing plastic deformation upon powder impact, resulting in a coating.

The coating is shot peened with peening media. For successful enhancement of bond strength between the coating and the substrate, the peening media must be harder than both the coating and the substrate.

The resulting enhancement in bond strength between the coating and the substrate decreases instances of disjoinment at the interface of the coating and the substrate and results in more durable and long-lasting parts.

Figure 1:
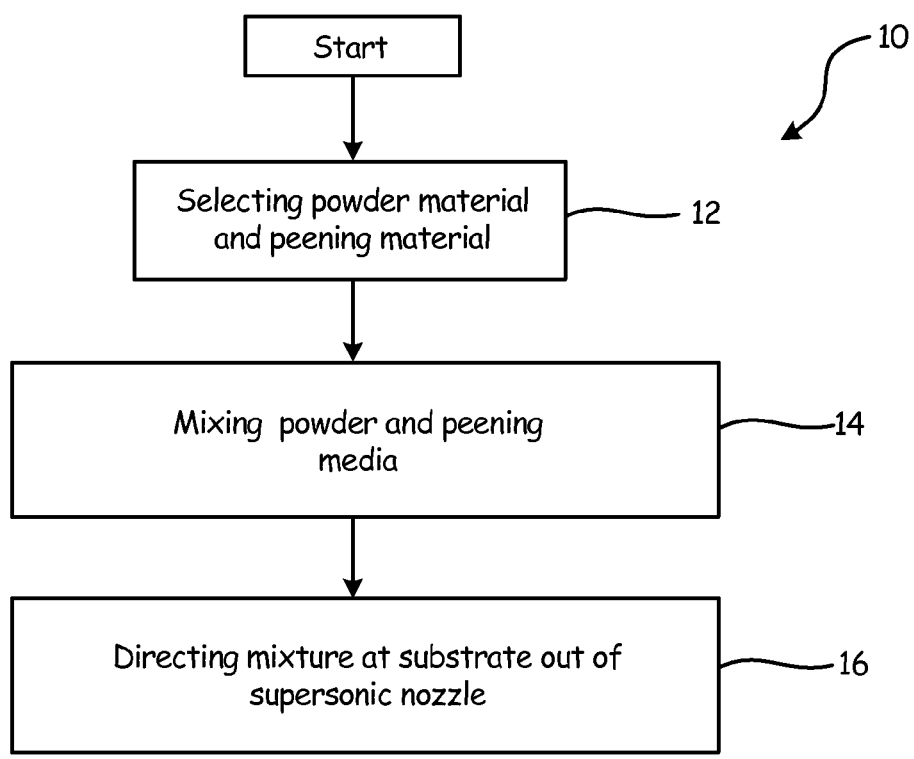
FIG. 1 is a flow chart for one embodiment wherein powder and peening media are mixed prior to entry into a supersonic nozzle.

FIG. 1 shows a flow chart for method 10 in which powder and peening media are mixed prior to entry into supersonic nozzle. At step 12, powder material and peening media are selected. Powder material, for example, can include alloys of copper, nickel, indium, various stainless steel alloys or aluminum alloys and as well pure metals and other alloy systems. The powder material has a distribution of powder sizes. For example, size of powders in distribution can range from about 10-100 microns, and preferably are in the range of about 10-60 microns. Powder size distribution selected must not overlap with peening media size distribution. This means that the largest powder in powder size distribution is smaller than the smallest peening media in peening media size distribution.

The selected peening media must be harder than both the coating and the substrate, as well as larger than the powder.

For example, spherical, ceramic Zirshot™ (68% monoclinic zirconium oxide and 32% vitreous phase) peening media with hardness of 7 GPa, available from SEPR Ceramic Beads and Powders, Mountainside, N.J., has been used to shot peen copper-nickel-indium coating with hardness of 1.039 GPa, available as CU101™ from Praxair Surface Technologies, Indianapolis, Ind., on 4140 steel substrate with hardness of 2.675 GPa. Preferably peening media will be about 1.5 to 2 times harder than the harder of the coating and substrate, but can be any amount harder. Use of peening media in shot peening that is harder than the coating and the substrate plastically deforms the coating and the substrate simultaneously. This simultaneous plastic deformation increases plastic flow at the interface of the substrate and the coating. As a result of increased plastic flow at the interface, the bond strength at the interface between the coating and the substrate is increased to at least twice that of the bond strength between the coating and the substrate without shot peening.

The peening media includes distribution of peening media sizes. There is much flexibility in selecting sizes of peening media in the distribution. For example, peening media sizes can range from about 30-400 microns. However, one constraint on selecting peening media size distribution is that peening media size distribution must not overlap with powder size distribution. This means that the smallest peening media in the peening media size distribution is larger than the largest powder in powder size distribution. It is important that the powder size distribution and the peening media size distribution be selected so that the two distributions do not overlap. This method is designed to prevent the incorporation of peening material into the coating. Selecting size distributions of powder and peening media that do not overlap prevents smaller peening media from becoming incorporated into larger, ductile metal coatings.

Finally, the peening media must be of a material that resists fracture upon impact. Selecting peening media that resists fracture upon impact is important for two reasons. First, using peening media that does not fracture keeps peening media material from becoming embedded in the coating. Second, when the peening media does not fracture larger plastic deformation results because more of the kinetic energy transferred from the peening media upon impact goes into plasticity of the substrate. If the peening media were to fracture, kinetic energy would be lost at impact and smaller plastic deformation would result. To select peening media that resists fracture upon impact, the primary considerations are hardness and geometry of the peening media. As previously stated, peening media must be harder than both the coating and the substrate. Peening media geometry which resists fracturing upon impact includes shapes which prevent high stress concentrations at corners. Preferred geometry of the peening media is spherical or spheroidal, elongated-shaped material due to the absence of corners.

If the peening media is of this described hardness and geometry so as to resist fracturing, it need not be ductile material. For example, it is possible to use brittle, spherical, ceramic peening media of the described hardness not metallurgically compatible with the coating material and the substrate. Alumina with silica and zirconia is peening media made specifically for peening because of its hardness and roundness. Although brittle material, the alumina, with a fracture toughness of 4 MPa(m)$^{1/2}$, is tough enough to resist fracturing and be used as peening media.

In step 14, the selected powder is mixed with the selected peening media, resulting in mixture of powder and peening media. The use of a mixture allows for simultaneous powder depositing, and thus formation of the coating, and shot peening.

In 16 the mixture of powder and peening media is directed out of a supersonic nozzle at a substrate. One technique for directing the mixture at the substrate, and therefore simultaneously forming the coating on the substrate and shot peening the coating, is by utilizing the cold spray technique with a supersonic nozzle. The mixture can be fed to the supersonic nozzle by a conventional powder feeder or hopper. By utilizing the supersonic nozzle, the powder and peening media can be directed out at high velocities. Higher powder velocity allows for a wider assortment of peening media which can be selected based on the requisite magnitude of plastic deformation. Upon powder impact with the substrate, plastic deformation of powder particles occurs, resulting in powder being deposited on the substrate as a coating. Upon impact of peening media, both the coating and the substrate are simultaneously plastically deformed resulting in an increase in plastic flow at the interface of the substrate and the coating. This increase in plastic flow at the interface produces a bond strength between the coating and the substrate that is at least twice a bond strength that is achieved between the coating and the substrate without shot peening.

The bond strength between the coating and the substrate may be at least 50% of the lesser of a strength of the coating and a strength of the substrate. In some instances, the bond strength between the coating and the substrate may be greater than 100% of the lesser of a strength of the coating and a strength of the substrate. In such instances, the coating or substrate (whichever has a lesser strength) will fail before the bond between the coating and the substrate fails. This is described for and shown in FIG. 8b.

Increase in bond strength can be measured according to a Triple Lug Shear Test detailed in military specification MIL-J-24445A. The following is a brief summary of the Triple Lug Shear Test of MIL-J-24445A used to measure bond strength. Powder is first deposited on a substrate, without shot peening, to form a coating which is then loaded parallel to the interface of the substrate and coating. The force at which the coating shears from the substrate is recorded (alternatively, in some instances where shot peening is not used, bond strength at the interface may be weak enough such that an endmill can be used to cut the powder from the substrate, recording the force on the endmill cutter when the interface bond breaks) This is followed by depositing the same powder on the same substrate with shot peening, loading the formed coating parallel to the interface, and recording the force at which the peened coating shears from the substrate. The difference in force at which the peened coating sheared from the substrate and non-peened coating sheared from the substrate represents the increase in bond strength between the coating and the substrate achieved with shot peening. For example, the bond strength between the coating and the substrate without shot peening may be 5 ksi and bond strength between the coating and the substrate with shot peening may be at least 10 ksi.

The velocity of the peening media sufficient to cause an increase in plastic flow at the interface of the substrate and coating (such that bond strength is at least twice the bond strength between coating and substrate without shot peening) will vary depending on the peening media and the powder. For example, for 6061 aluminum alloy powder coating with a hardness of 0.726 GPa deposited on a hardened 6061 aluminum alloy substrate with hardness of 1.089 GPa and shot peened with spherical, ceramic Zirshot™ peening media with density of 3850 kg/m³ and hardness of 7 GPA sized from 200-400 microns, 220 micron peening media can cause sufficient increased plastic flow at an approximate velocity of 275 m/s. Peening media in this distribution sized at 300 micron can cause sufficient increased plastic flow at an approximate velocity of 230 m/s, and peening media in this distribution sized at 380 micron can cause sufficient increased plastic flow at an approximate velocity of 200 m/s.

Even greater plastic flow, and therefore bond strength, at the interface can be created by increasing proportion of peening media used in the mixture or increasing energy of the peening media upon impact. Energy of the peening media can be increased by increasing mass and/or velocity.

Figure 2:
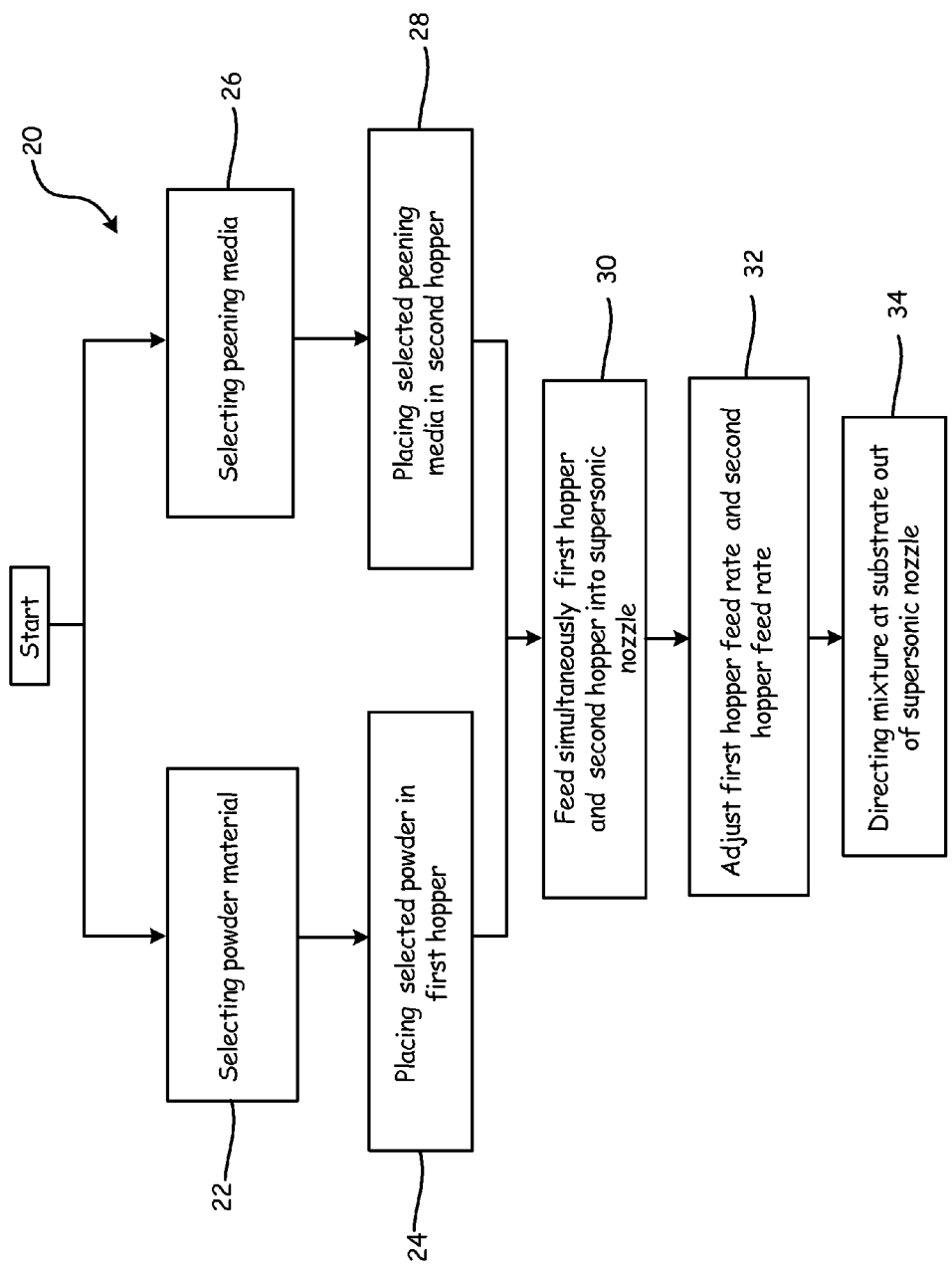
FIG. 2 is a flow chart for one embodiment wherein powder and peening media are fed by separate hoppers into a supersonic nozzle.

Another embodiment, method 20, is shown in FIG. 2 by a flow chart in which powder and peening media are fed by separate hoppers or feeders into a supersonic nozzle. In step 22, powder material is selected in the same manner as that detailed for step 12 of method 10 shown in FIG. 1. In step 24, the selected powder material in placed in a first hopper or feeder having a first feed rate control. The first hopper can be a conventional powder feeder or a powder feeder such as that disclosed in U.S. Pat. No. 6,715,640 issued to Tapphorn et al., both of which have feed rate control. Placing powder in a hopper separate from peening media allows powder to be fed at rate which is variable and either the same as or different from the peening media feed rate.

In step 26, peening media is selected in the same manner as that detailed for step 12 of method 10 shown in FIG. 1. In step 28 the selected peening media in placed in a second hopper having a second feed rate control. The second hopper can be a conventional powder feeder or a powder feeder such as that disclosed in U.S. Pat. No. 6,715,640 issued to Tapphorn et al., both of which have feed rate control. Placing peening media in hopper separate from powder allows peening media to be fed at rate which is variable and either the same as or different from the powder feed rate.

Steps 22, 24, 26, and 28 can be performed in the order shown in FIG. 2, or in another order. For example, the peening media can be selected first. Also, both the powder and the peening media can be selected before the powder and peening media are loaded into their respective hoppers.

In step 30, both powder contents of first hopper at first selected rate and peening media contents of second hopper at second selected rate are fed simultaneously to a supersonic nozzle. Feeding both powder and peening media into supersonic nozzle results in a mixture of powder and peening media with a ratio that is a function of the respective feed rates. This mixture allows for simultaneous powder depositing, and thus formation of a coating, and shot peening.

Step 32 shows adjusting first hopper feed rate and second hopper feed rate to obtain a desired ratio of powder to peening media. Adjusting first hopper feed rate will modify amount of powder delivered to supersonic nozzle, and therefore change the ratio of powder directed out of supersonic nozzle. Similarly, adjusting second hopper feed rate will modify amount of peening media delivered to supersonic nozzle, and therefore change the ratio of peening media directed out of supersonic nozzle.

For example, first hopper feed rate and second hopper feed rate may be adjusted such that when beginning to form a coating, a majority of the initial mixture directed out of supersonic nozzle is peening media. Examples of initial mixture ratios of peening media to powder that have worked well include about 9:1 or 7.5:2.5. Subsequently, particularly after a first coating layer has been formed, it is beneficial to change the mixture of powder and peening media directed out of supersonic nozzle to a majority powder. Changing the mixture to the inverse of the ratio used in initial mixture has worked well—about 1:9 or 2.5:7.5 peening media to powder. If too high of ratio of peening media to powder continues to be directed out of supersonic nozzle over time, then work-hardening of the coating could be caused. By adjusting the first hopper feed rate and the second hopper feed rate such that a majority of the initial mixture of powder and peening media directed out of supersonic nozzle is peening media, bond strength between the coating and the substrate is enhanced. Higher ratios of peening media to powder result in greater increases in bond strength between the coating and the substrate. By subsequently changing the mixture to a majority of powder, particularly after a first coating layer has been formed, the density of the coating is increased.

In step 34, the resulting mixture of powder and peening media is directed out by the supersonic nozzle at the substrate. The mixture of powder and peening media is directed at the substrate out of supersonic nozzle in the same manner as that detailed for step 16 of method 10 shown in FIG. 1.

Figure 3:
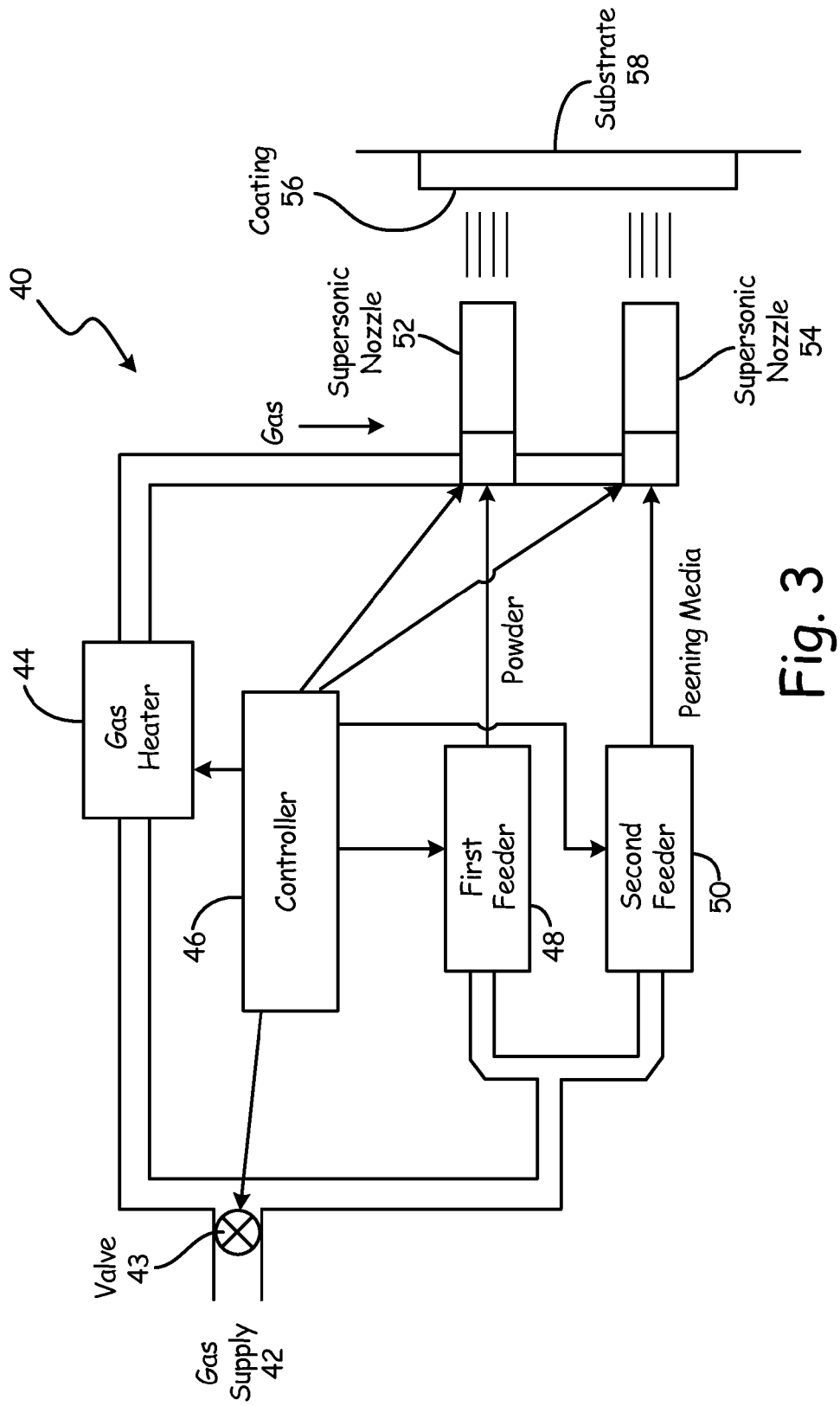
FIG. 3 is a block diagram for one embodiment wherein powder and peening media are directed out of two, separate supersonic nozzles.

FIG. 3 shows a block diagram of impact consolidation system 40, in which powder and peening media are directed out of two separate supersonic nozzles. Impact consolidation system 40 is similar to a conventional cold spray system, but utilizes two feeders and two supersonic nozzles.

Impact consolidation system 40 includes gas supply 42, valve 43, gas heater 44, controller 46, first feeder 48, supersonic nozzle 52, second feeder 50, supersonic nozzle 54. System 40 sprays powder to produce coating 56 on substrate 58. Gas of gas supply 42 can be, for example, nitrogen or helium. First feeder 48 and second feeder 50 can be, for example, conventional powder feeders or a powder feeder such as that disclosed in U.S. Pat. No. 6,715,640 issued to Tapphorn et al.

Gas supply 42 is connected through valve 43 to upper branch passing to gas heater 44 and lower branch passing to first feeder 48 and second feeder 50. Gas heater 44 is fixed to deliver gas into both supersonic nozzle 52 and supersonic nozzle 54. First feeder 48 is joined to supersonic nozzle 52 and second feeder 50 is joined to supersonic nozzle 54. Controller 46 is linked to provide centralized control over valve 43, gas heater 44, first feeder 48, second feeder 50, supersonic nozzle 52, and supersonic nozzle 54.

Controller 46 opens valve 43 so that gas from gas supply 42 is partly directed through upper branch to gas heater 44, which heats gas to a temperature anywhere in an approximate range of 20-600° C. After gas is heated in gas heater 44, it passes into supersonic nozzle 52 and supersonic nozzle 54. Gas not directed through gas heater 44 passes through lower branch and is used as a carrier gas into first feeder 48 and second feeder 50. Powder is first fed from first feeder 48 to supersonic nozzle 52 and directed out at substrate 58 resulting in plastic deformation upon powder impact and the formation of coating 56. Once powder is deposited on substrate 58 and coating 56 is formed, the depositing of powder is terminated. Peening media is then immediately fed from second feeder 50 and directed out of supersonic nozzle 54 to shot peen coating 56, resulting in increase in density of coating 56. Powder directed out of supersonic nozzle 52 and peening media directed out of supersonic nozzle 54 can travel at velocities anywhere between about 200-1200 m/s depending on desired coating 56 properties.

If a number of coating layers are desired, powder is then again fed from first feeder 48 and directed out of supersonic nozzle 52 at densified coating 56. Immediately after forming new coating on top of densified coating 56, depositing is terminated and peening media is again fed from second feeder 50 and directed out of supersonic nozzle 54 to shot peen newly formed coating. This method is repeated for each additional coating layer desired.

Controller 46 can be used to control entry of gas from gas supply 42 at valve 43, heating of gas at gas heater 44, timing and feeding rate of powder from first feeder 48 to supersonic nozzle 52, timing and feeding rate of peening media from second feeder 50 to supersonic nozzle 54, speed at which powder is directed from supersonic nozzle 52, speed at which peening media is directed from supersonic nozzle 54, and movements of supersonic nozzle 52 and supersonic nozzle 54 relative to substrate 58.

Powder delivered by first feeder 48 to supersonic nozzle 52 can include, for example, copper, stainless steel, nickel, indium, or aluminum, and alloys and is selected in the same manner as that detailed for step 12 of method 10 shown in FIG. 1.

The peening media delivered by second feeder 50 to supersonic nozzle 54 must be at least 1.5 times hardness of coating to increase deification of coating. For example, spherical, ceramic Zirshot™ (68% monoclinic zirconium oxide and 32% vitreous phase) peening media with a hardness of 7 GPa, available from SEPR Ceramic Beads and Powders, Mountainside, N.J., has been used to shot peen and densify copper-nickel-indium coating with a hardness of 1.039 GPa, available as CU101™ from Praxair Surface Technologies, Indianapolis, Ind., on a 4140 steel substrate. Otherwise, peening media is selected in the same manner as that detailed for step 12 of method 10 shown in FIG. 1.

The use of system 40 as described, results in a reduction in porosity of coating 56 and additional coating layers added. This reduction in porosity of coating, and therefore increase in deification, produces articles that are stronger and fit for high intensity conditions.

Figure 4:
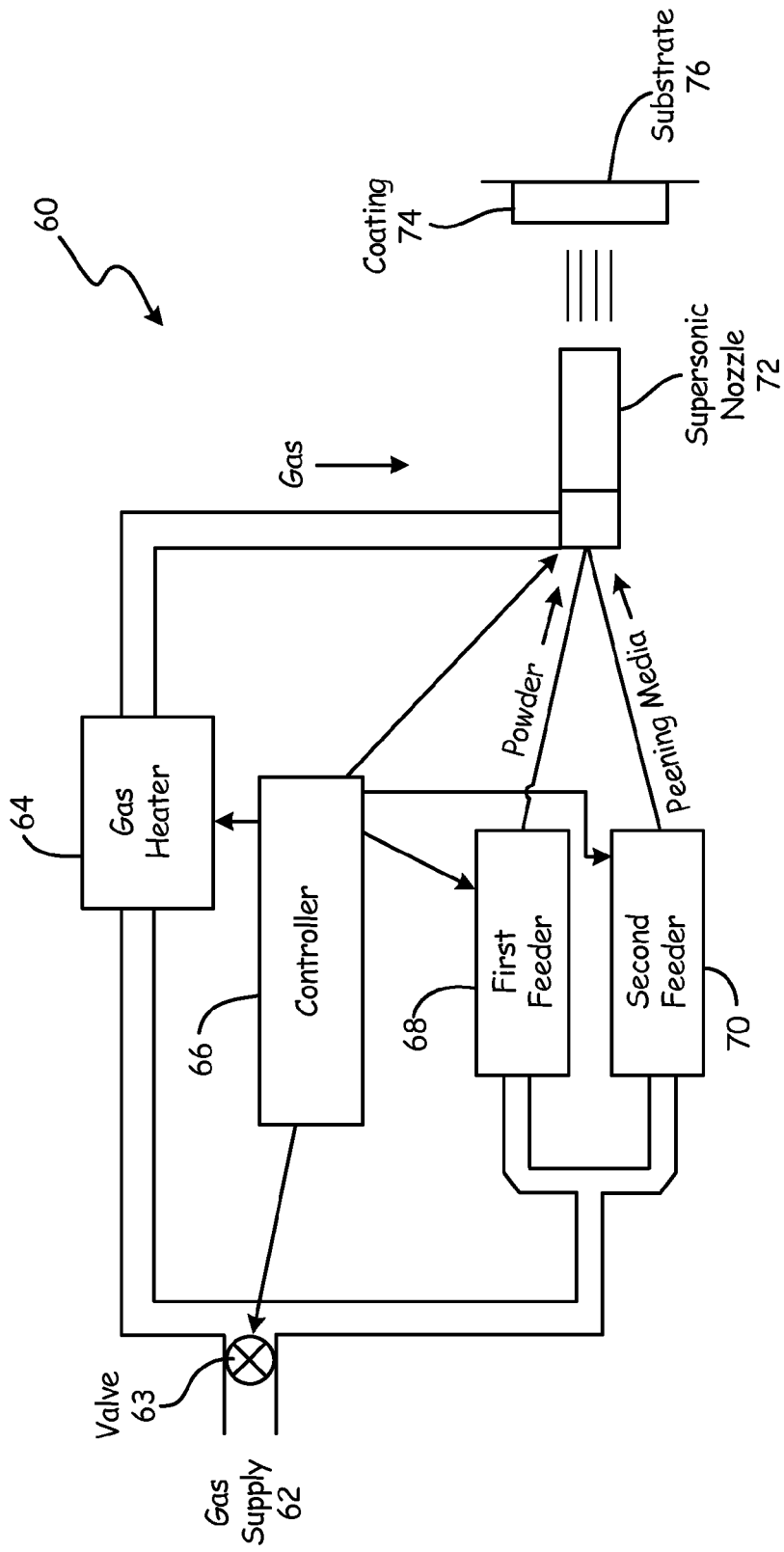
FIG. 4 is a block diagram for one embodiment wherein powder and peening media are directed out of a single, common supersonic nozzle.

FIG. 4 is a block diagram of impact consolidation system 60, in which powder and peening media are directed out of single or common supersonic nozzle. Impact consolidation system 60 is similar to a conventional cold spray system, but utilizes two feeders and one supersonic nozzle.

Impact consolidation system 60 includes gas supply 62, valve 63, gas heater 64, controller 66, first feeder 68, second feeder 70, and supersonic nozzle 72. System 60 sprays powder to produce coating 74 on substrate 76. Gas of gas supply 62 can be, for example, nitrogen or helium. First feeder 68 and second feeder 70 can be, for example, conventional powder feeders or a powder feeder such as that disclosed in U.S. Pat. No. 6,715,640 issued to Tapphorn et al.

Gas supply 62 is connected through valve 63 to upper branch passing to gas heater 64 and lower branch passing to first feeder 68 and second feeder 70. Gas heater 64 is fixed to deliver gas into supersonic nozzle 72. First feeder 68 and second feeder 70 are joined to supersonic nozzle 72. Controller 66 is linked to provide centralized control over valve 63, gas heater 64, first feeder 68, second feeder 70, and supersonic nozzle 72.

Controller 66 opens valve 63 so that gas from gas supply 62 is then partly directed through upper branch to gas heater 64, which heats gas to a temperature anywhere in an approximate range of 20-600° C. After gas is heated in gas heater 64, it passes into supersonic nozzle 72. Gas not directed through gas heater 64 passes through lower branch and is used as a carrier gas into first feeder 68 and second feeder 70. Powder is first fed from first feeder 68 to supersonic nozzle 72 and directed out at substrate 76 resulting in plastic deformation upon powder impact and the formation of coating 74. Once powder is deposited on substrate 76 and powder coating 74 is formed, the depositing of powder is terminated. Peening media is then immediately fed from second feeder 70 and directed out of supersonic nozzle 72 to shot peen coating 74, resulting in increase in density of coating 74. Powder and peening media directed out of supersonic nozzle 72 can travel at velocities anywhere between about 200-1200 m/s depending on desired coating 74 properties.

If a number of coating layers are desired, powder is then again fed from first feeder 68 and directed out of supersonic nozzle 72 at densified coating 74. Immediately after forming new coating on top of densified coating 74, depositing is terminated and peening media is again fed from second feeder 70 and directed out of supersonic nozzle 72 to shot peen newly formed coating. This method is repeated for each additional coating layer desired.

Controller 66 can be used to control flow of gas from gas supply 62 through valve 63, heating of gas at gas heater 64, timing and feeding rate of powder from first feeder 68 to supersonic nozzle 72, timing and feeding rate of peening media from second feeder 70 to supersonic nozzle 72, speed at which powder is directed from supersonic nozzle 72, and movements of supersonic nozzle 72 relative to substrate 76.

Powder delivered by first feeder 68 to supersonic nozzle 72 can include copper, stainless steel, nickel, indium, or aluminum, and is selected in the same manner as that detailed for step 12 of method 10 shown in FIG. 1.

The peening media delivered by second feeder 70 to supersonic nozzle 72 must be at least 1.5 times hardness of the coating to increase deification of the coating. For example, spherical, ceramic Zirshot™ (68% monoclinic zirconium oxide and 32% vitreous phase) peening media with a hardness of 7 GPa, available from SEPR Ceramic Beads and Powders, Mountainside, N.J., has been used to shot peen and densify copper-nickel-indium coating with a hardness of 1.039 GPa, available as CU101™ from Praxair Surface Technologies, Indianapolis, Ind., on a 4140 steel substrate. Otherwise, peening media is selected in the same manner as that detailed for step 12 of method 10 shown in FIG. 1.

The use of system 60 as described, results in a reduction in porosity of coating 74 and additional coating layers added. This reduction in porosity of coating, and therefore increase in deification, produces articles that are stronger and fit for high intensity conditions.

Figure 5:
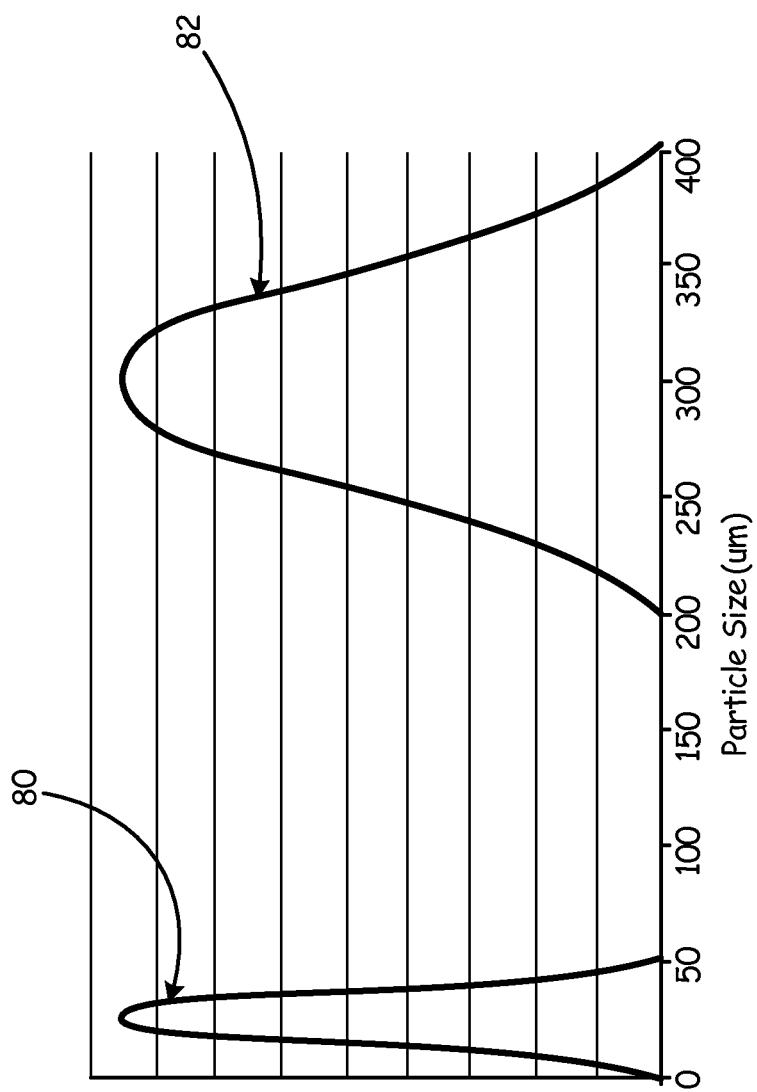
FIG. 5 is a graph of size distribution curves for both powder and peening media of one embodiment showing a lack of overlap between a size distribution of powder and a size distribution of peening media.

FIG. 5 is a graph showing size distribution curve 80 for powder size distribution and size distribution curve 82 for peening media size distribution. Powder size distribution shown by curve 80 ranges between 0-50 microns, with the largest percentage of powder in powder size distribution being 25 microns. Powder size distributions between about 0-100 microns have been used, however, more often the powder size distribution is between about 10-60 microns.

Peening media size distribution shown by curve 82 ranges between 200-400 microns, with the largest percentage of peening media in peening media size distribution being 300 micron. Peening media size distributions can vary widely as there is much flexibility in size of peening media that can be used, and the peening media size distribution need not be a bell curve. A constraint on selecting both powder size distribution and peening media size distribution is that the powder size distribution selected must not overlap with the peening media size distribution selected. This means that smallest peening media in peening media size distribution is larger than largest powder in the powder size distribution. It is designed that peening material be prevented from being incorporated into the coating. By selecting size distributions of powder and peening media that do not overlap, smaller peening particles are prevented from becoming incorporated into larger, ductile metal coatings. As can be seen in FIG. 5, there are neither powder nor peening media sized between 50-200 microns, and therefore, the two size distributions illustrated by curves 80 and 82 do not overlap.

Figure 6:
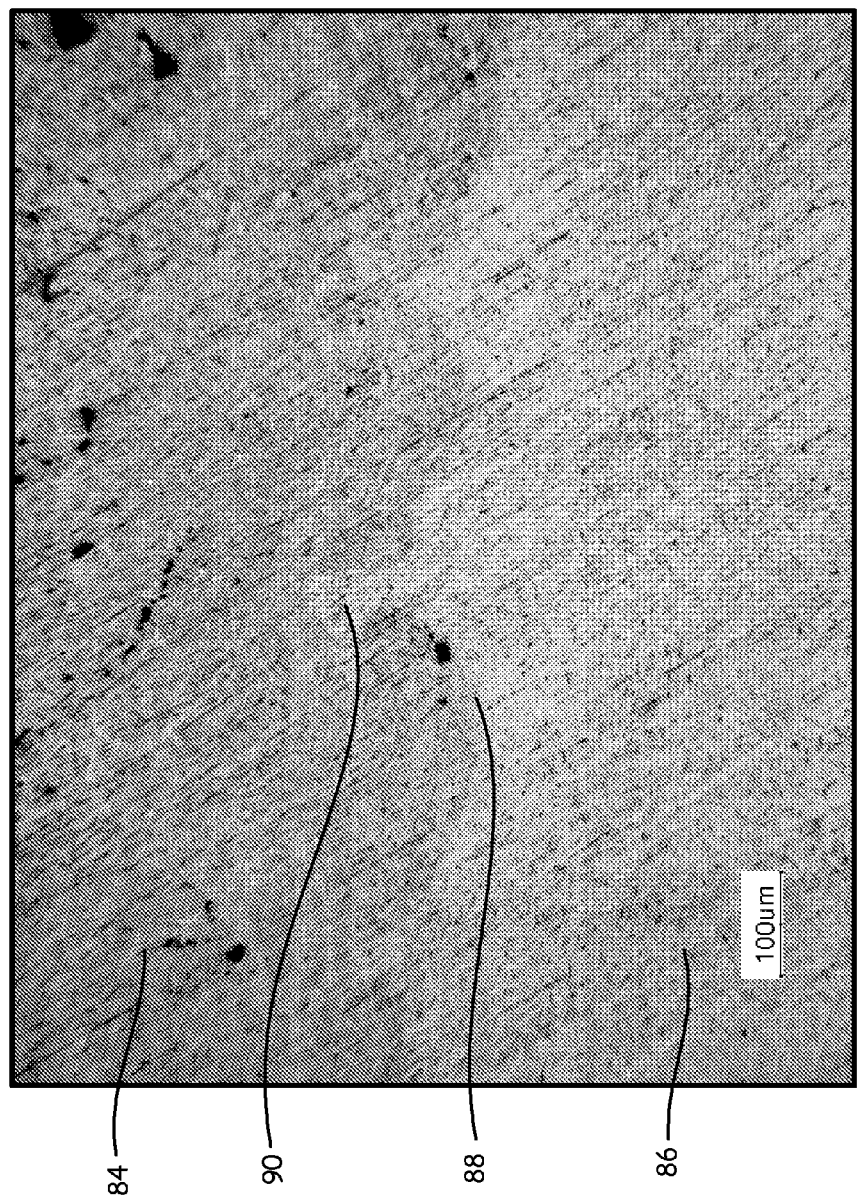
FIG. 6 is a micrograph cross-section of 6061 aluminum alloy coating on a hardened 6061 aluminum alloy substrate with use of shot peening.

FIG. 6 is a micrograph cross-section of coating 84 on substrate 86 after shot peening. Coating 84 is 6061 aluminum alloy in a solution condition with hardness of 0.726 GPa. Size distribution of powders making up coating 84 ranged from about 20-53 microns. Substrate 86 is hardened 6061 aluminum alloy in T6 or aged condition with hardness of 1.089 GPa, and was sanded to remove any bumps and cleaned with a solvent before having coating 84 formed on it.

In FIG. 6, coating 84 was deposited on substrate 86 and shot peened by use of method 20 shown in FIG. 2, in which powder materials making up coating 84 and peening media were simultaneously directed at substrate 86 using the cold spray technique fed by two separate hoppers. Coating 84 and peening media were sprayed using nitrogen gas at temperature of about 400° C. and pressure of about 40 bar. Powder making up coating 84 in the powder size distribution sized at 20 micron traveled at velocity of about 715 m/s, and powder making up coating 84 sized at 53 micron traveled at velocity of about 630 m/s. Peening media used to shot peen coating 84 formed on substrate 86 in FIG. 6 was spherical, ceramic Zirshot™ (68% monoclinic zirconium oxide and 32% vitreous phase) peening media with a hardness of 7 GPa, available from SEPR Ceramic Beads and Powders, Mountainside, N.J. Peening media was, therefore, harder than both coating 84 and substrate 86. Peening media size distribution ranged from 200-400 microns. The particle size that had highest concentration in the peening media distribution was 300 micron, directed out of supersonic nozzle at velocity of about 230 m/s. The smallest peening media in the distribution (220 microns), was directed out of the supersonic nozzle at about 275 m/s, while the largest peening media in distribution (380 microns) was directed out at about 200 m/s.

Increase in plastic flow at interface after shot peening 88 of substrate 86 and coating 84 can be seen in FIG. 6. In FIG. 6 substrate 86 has moved up into coating 84 in multiple locations, including location 90. Furthermore, interface 88 (after shot peening) contains a mixing of coating 84 and substrate 86 as a result of shot peening, making interface 88 difficult to see. Increase in plastic flow at interface 88 produced by shot peening results in a bond strength between coating 84 and substrate 86 that is at least twice the bond strength between coating 84 and substrate 86 without shot peening.

Bond strength between coating 84 and substrate 86 without shot peening was about 5 psi. Bond strength at interface without shot peening was so weak that an endmill was used to cut coating 84 from substrate 86. The bond at interface 88 broke upon endmill contact with about 10 pounds of force. On the other hand, bond strength produced as a result of causing increased plastic flow at interface 88 after shot peening in FIG. 6 was over 10,200 psi. Even at a shear force of 10,200 psi, the bond at interface 88 after shot peening did not fail. Rather, failure at this force was within coating 84.

The considerable increase in bond strength is especially notable here under the particular circumstances. Coating 84 is a relatively soft alloy with hardness of 0.726 GPa, while substrate 86 is hardened 6061 aluminum alloy with hardness of 1.089 GPa. Forming a coating on a substrate which is harder than the powder represents a difficult circumstance for bonding at the interface of the coating and the substrate. Furthermore, using nitrogen gas to direct powder onto the substrate results in powder traveling at a lower velocity upon impact with the substrate than powder otherwise would travel at using a different gas, such as helium. This lower velocity at powder impact results in a weaker initial bond at the interface of the coating and the substrate. Thus, by using a substrate and a powder which make bonding at interface difficult and impact velocities which result in weaker bonds, it is notable that the shot peening used was able to increase bond strength from about 5 psi to over 10,200 psi.

FIG. 7a shows a side-elevational photograph of same coating 84a formed on same substrate 86a using the cold spray technique without shot peening. Interface 88a without shot peening is also present.

Figure 7B:
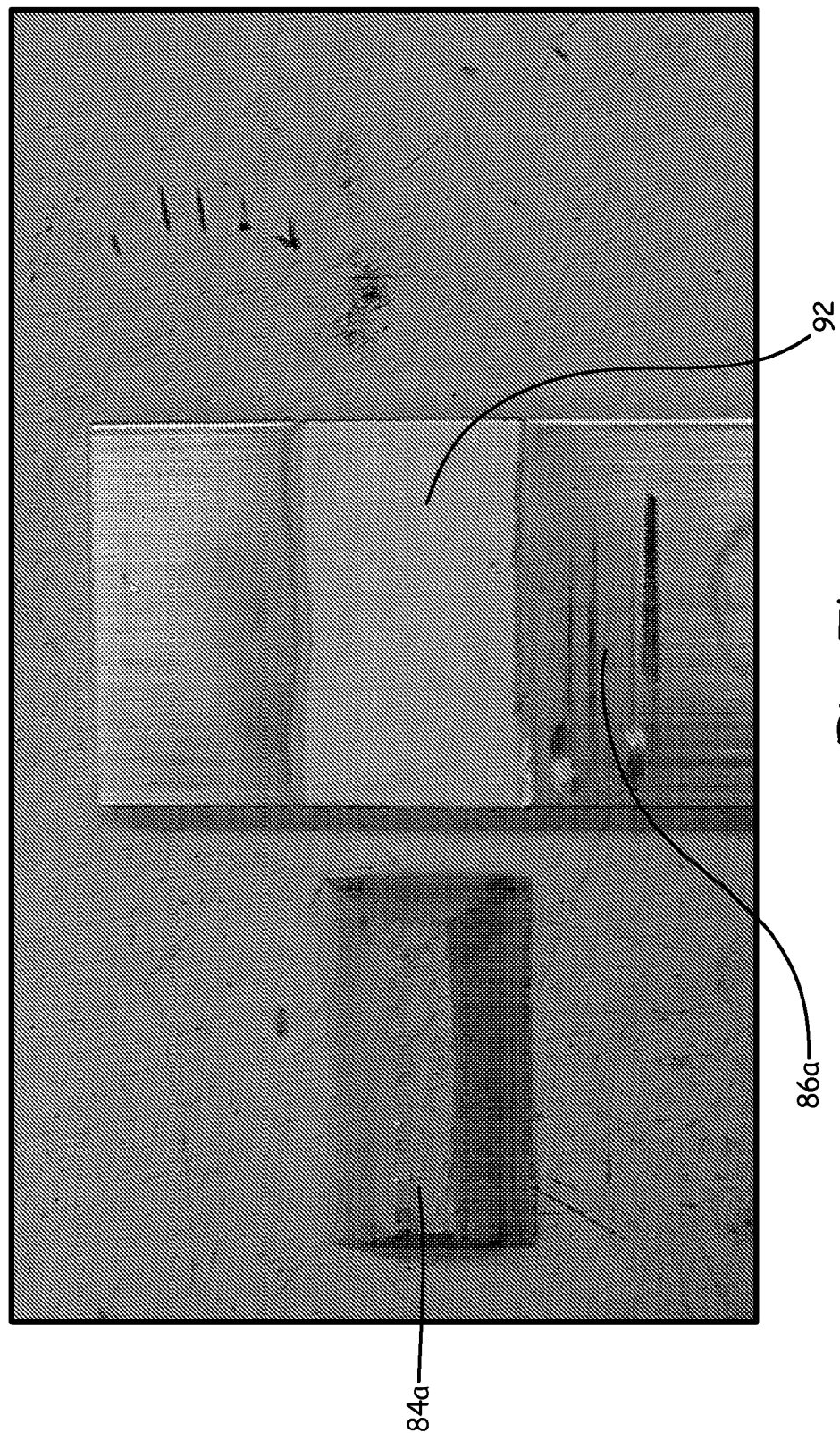
FIG. 7b is a top plan view photograph of the coating and substrate of FIG. 7a, without shot peening, after the coating was cut from the substrate.

FIG. 7b is a top plan view photograph of coating 84a and substrate 86a of FIG. 7a after coating 84a was cut from substrate 86a. In some instances, where shot peening is not used, bond strength at interface may be weak enough such that an endmill can be used to cut coating 84a from substrate 86a. Bond strength at interface 88a without shot peening can then be measured by recording force on the endmill cutter when interface bond breaks. Here, bond at interface 88a, without shot peening, broke when the endmill had about 10 pounds of force on the cutter, equating bond strength to be about 5 psi (bond area was about 2 in$^2$). Bond break 92 can be seen in FIG. 7b, as there is only substrate 86a at the location where coating 84a had been deposited in FIG. 7a.

Figure 8A:
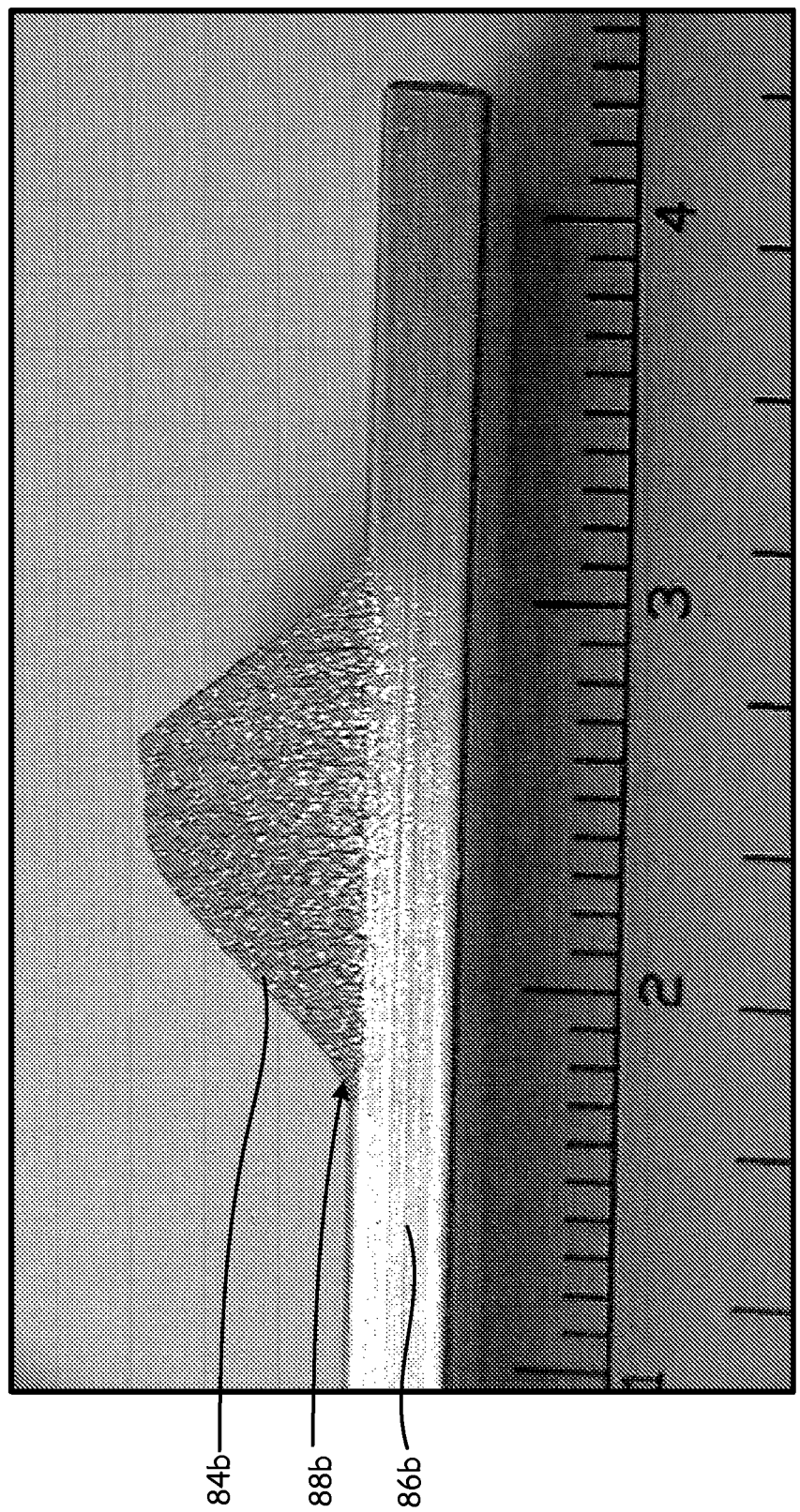
FIG. 8a is a side-elevational photograph of 6061 aluminum alloy coating on a hardened 6061 aluminum alloy substrate with use of shot peening.

FIG. 8a is a side-elevational photograph of coating 84b formed on substrate 86b after shot peening as detailed in description of FIG. 6. Interface 88b after shot peening is also present. Coating 84b is made of the same powder material as coating 84a, and substrate 86b is the same substrate material as substrate 86a of FIGS. 7a and 7b.

Figure 8B:
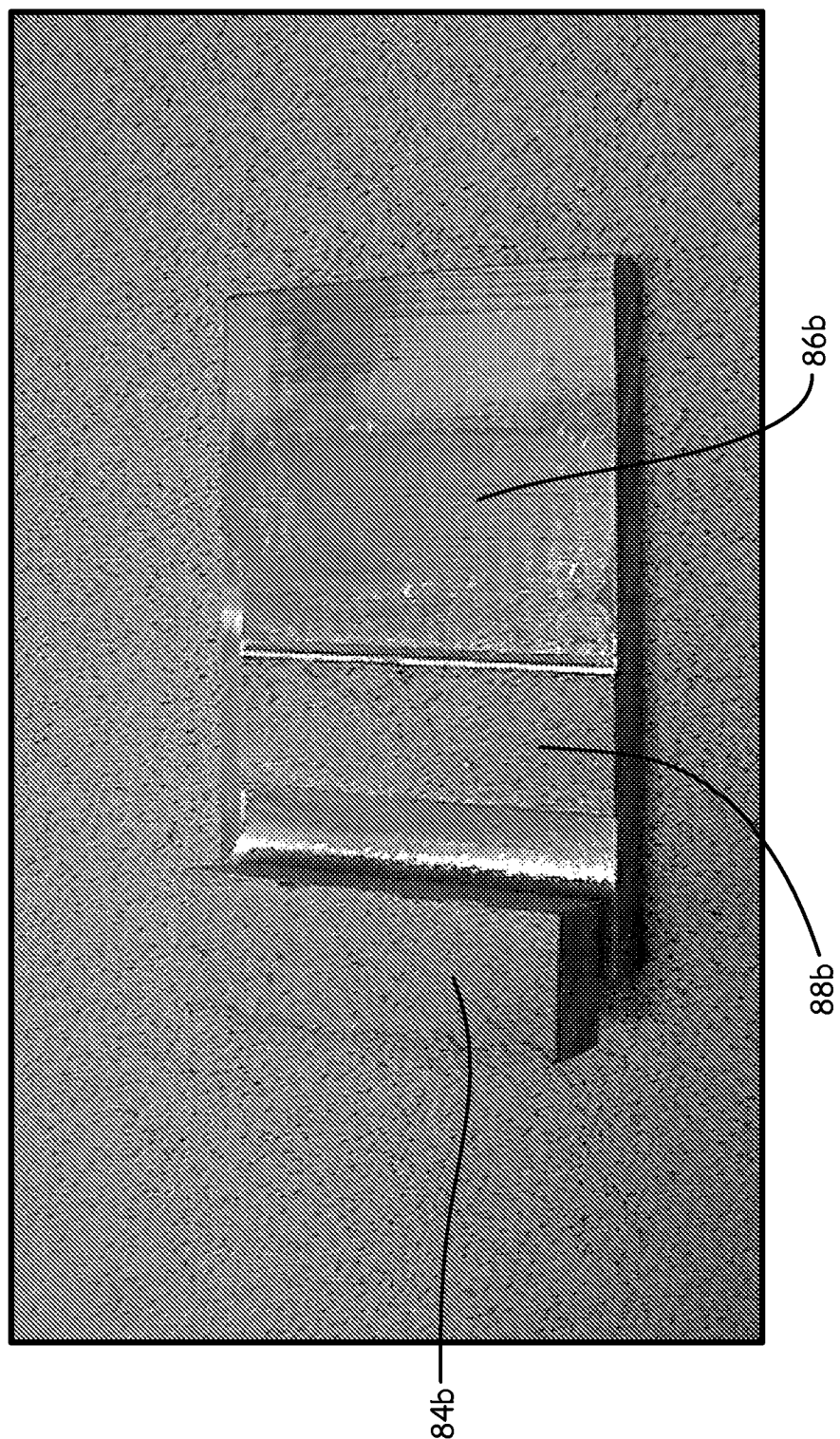
FIG. 8b is a top plan view photograph of the coating and substrate of FIG. 8a, with use of shot peening, showing the bond at interface still present after the coating failed.

FIG. 8b is a top plan view photograph of coating 84b and substrate 86b after coating 84b failed when sheared. Coating 84b failed when a shear force of 10,200 psi was applied; however, the bond at the interface 88b after shot peening did not break, but rather is still present in FIG. 8b. Therefore, shot peening was used to increase bond strength between coating 84b and substrate 86b from 5 psi to over 10,200 psi.

Discussion of Possible Embodiments

The following are non-exclusive descriptions of possible embodiments of the present invention.

A method comprising depositing a powder on a substrate to form a coating, and shot peening the coating with a peening media that is harder than both the coating and the substrate to produce a bond strength between the coating and the substrate that is at least twice a bond strength between the coating and the substrate without shot peening.

The method of the preceding paragraph can optionally include, additionally and/or alternatively, any one or more of the following steps features, and/or additional components:

A further embodiment of the foregoing method, further comprising mixing the powder and the peening media to form a mixture, and directing the mixture at the substrate to simultaneously deposit the powder and shot peen.

A further embodiment of the foregoing method, further comprising controlling feed rate of powder delivered from a first hopper, and controlling feed rate of peening media delivered from a second hopper.

A further embodiment of the foregoing method, wherein the powder and the peening media are directed out of a supersonic nozzle.

A further embodiment of the foregoing method, wherein the depositing and the shot peening occur simultaneously. Initially a majority of a mixture of powder and peening media directed out of the supersonic nozzle is peening media, and subsequently the mixture changes to the majority being powder to increase a density of the coating.

A further embodiment of the foregoing method, wherein a peening media size distribution does not overlap a powder size distribution such that a smallest peening particle in the peening media size distribution is larger than a largest powder particle in the powder size distribution.

A further embodiment of the foregoing method, wherein the peening media comprises particles that resist fracture upon impact.

A further embodiment of the foregoing method, wherein the peening media comprises spherical or spheroidal shaped ceramic particles.

A method comprising (a) depositing a powder on a substrate to form a coating layer, and (b) shot peening the coating layer with a peening media that is at least 1.5 times a hardness of the coating layer to cause an increase in deification of the coating layer.

The method of the preceding paragraph can optionally include, additionally and/or alternatively, any one or more of the following steps features, and/or additional components:

A further embodiment of the foregoing method, further comprising repeating steps (a) and (b) to form a plurality of coating layers.

A further embodiment of the foregoing method, wherein depositing powder comprises directing the powder out of a first supersonic nozzle toward the substrate, and shot peening the coating layer comprises directing the peening media out of a second supersonic nozzle toward the coating layer.

A further embodiment of the foregoing method, wherein depositing powder and shot peening comprise directing the powder and the peening media out of a common supersonic nozzle toward the substrate.

A further embodiment of the foregoing method, wherein a peening media size distribution does not overlap a powder size distribution such that a smallest peening particle in the peening media size distribution is larger than a largest powder particle in the powder size distribution.

A further embodiment of the foregoing method, wherein the peening media comprises particles that resist fracture upon impact.

A further embodiment of the foregoing method, wherein the peening media comprises spherical or spheroidal shaped ceramic particles.

An article comprising a substrate, and a coating formed by powder deposited on the substrate and the substrate is at least 50% of the lesser of a strength of the coating and a strength of the substrate.

The powder layer deposited on a substrate of the preceding paragraph can optionally include, additionally and/or alternatively, any one or more of the following features, configurations and/or additional components:

A further embodiment of the foregoing article, wherein the substrate and coating are both metal.

A further embodiment of the foregoing article, wherein the coating is a shot peened coating.

A further embodiment of the foregoing article, wherein the shot peened coating is formed by shot peening with a peening media that is harder than both the coating and the substrate.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   depositing a powder on a substrate to form a coating; and
   shot peening the coating with a peening media that is harder than both the coating and the substrate to produce a bond strength between the coating and the substrate that is at least twice a bond strength between the coating and the substrate without shot peening;
   wherein the depositing and the shot peening occur simultaneously and wherein a ratio of peening media to powder is varied as the coating is formed, the ratio being varied from comprising a majority of peening media initially to comprising a majority of powder with subsequent deposition.

2. The method of claim 1 further comprising:
   mixing the powder and the peening media to form a mixture; and
   directing the mixture at the substrate to simultaneously deposit the powder and shot peen.

3. The method of claim 1, wherein the powder and the peening media are directed out of a supersonic nozzle.

4. The method of claim 1 further comprising:
   controlling feed rate of powder delivered from a first hopper; and
   controlling feed rate of peening media delivered from a second hopper.

5. The method of claim 1 wherein a peening media size distribution does not overlap a powder size distribution such that a smallest peening particle in the peening media size distribution is larger than a largest powder particle in the powder size distribution.

6. The method of claim 1 wherein the peening media comprises particles that do not fracture upon impact.

7. The method of claim 6 wherein the peening media comprises spherical or spheroidal shaped ceramic particles.

8. The method of claim 1, wherein the initial mixture ratio of peening media to powder is at least 7.5:2.5.

9. The method of claim 1, wherein the subsequent mixture ratio of peening media to powder is at most 2.5:7.5.

10. A method comprising:
    depositing a powder on a substrate to form a coating layer; and
    shot peening the coating layer with a peening media that is at least 1.5 times a hardness of the coating layer to cause an increase in densification of the coating layer:
    wherein the depositing and the shot peening occur simultaneously and wherein a ratio of peening media to powder is varied as the coating is formed, the ratio being varied from comprising a majority of peening media initially to comprising a majority of powder with subsequent deposition.

11. The method of claim 10 wherein depositing powder comprises directing the powder out of a first supersonic nozzle toward the substrate, and shot peening the coating layer comprises directing the peening media out of a second supersonic nozzle toward the coating layer.

12. The method of claim 10 wherein depositing powder and shot peening comprise directing the powder and the peening media out of a common supersonic nozzle toward the substrate.

13. The method of claim 10 wherein a peening media size distribution does not overlap a powder size distribution such that a smallest peening particle in the peening media size distribution is larger than a largest powder particle in the powder size distribution.

14. The method of claim 10 wherein the peening media comprises particles that that do not fracture upon impact.

15. The method of claim 14 wherein the peening media comprises spherical or spheroidal shaped ceramic particles.

16. An article comprising:
a substrate;
a coating formed by simultaneously depositing a powder on the substrate to form a coating layer and shot peening the coating layer with a peening media that is harder than both the coating and the substrate, wherein a ratio of peening media to powder is varied as the coating is formed, the ratio being varied from comprising a majority of peening media initially to comprising a majority of powder with subsequent deposition; and
a bond between the coating and the substrate, the bond having a bond strength that is at least 50% of the lesser of a strength of the coating and a strength of the substrate.

17. The article of claim 16 wherein the substrate and the coating are both metal.

18. The article of claim 16 wherein the coating is a shot peened coating.

19. The article of claim 18 wherein the shot peened coating is formed by shot peening with a peening media that is harder than both the coating and the substrate.

* * * * *

UNITED STATES PATENT AND TRADEMARK OFFICE
CERTIFICATE OF CORRECTION

PATENT NO. : 9,938,624 B2
APPLICATION NO. : 15/025427
DATED : April 10, 2018
INVENTOR(S) : Aaron T. Nardi et al.

Page 1 of 1

It is certified that error appears in the above-identified patent and that said Letters Patent is hereby corrected as shown below:

In the Specification

Column 1, Line 53:
Delete "deification"
Insert --densification--

Column 7, Line 22:
Delete "deification"
Insert --densification--

Column 7, Line 35:
Delete "deification"
Insert --densification--

Column 8, Line 32:
Delete "deification"
Insert --densification--

Column 8, Line 46:
Delete "deification"
Insert --densification--

Column 11, Line 22:
Delete "deification"
Insert --densification--

Signed and Sealed this
Twenty-first Day of August, 2018

Andrei Iancu
*Director of the United States Patent and Trademark Office*